(12) United States Patent
Vu

(10) Patent No.: US 7,281,166 B1
(45) Date of Patent: Oct. 9, 2007

(54) USER-CUSTOMIZABLE INPUT ERROR HANDLING

(75) Inventor: Calvin H. Vu, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 478 days.

(21) Appl. No.: 10/448,678

(22) Filed: May 29, 2003

(51) Int. Cl.
*G06F 11/00* (2006.01)

(52) U.S. Cl. .......................................... 714/38; 714/49

(58) Field of Classification Search .............. 714/5, 714/43, 38, 49
See application file for complete search history.

(56) References Cited

U.S. PATENT DOCUMENTS

| | | | | |
|---|---|---|---|---|
| 6,269,460 B1* | 7/2001 | Snover | .......................... | 714/48 |
| 6,334,193 B1* | 12/2001 | Buzsaki | .......................... | 714/2 |
| 6,883,109 B2* | 4/2005 | Erickson et al. | ................ | 714/5 |
| 6,971,047 B2* | 11/2005 | Mayer et al. | .................. | 714/38 |
| 6,973,643 B2* | 12/2005 | Goldsmith et al. | ......... | 717/124 |
| 2003/0023962 A1* | 1/2003 | Erickson et al. | ............ | 717/171 |
| 2004/0034847 A1* | 2/2004 | Joffrain et al. | .............. | 717/113 |

OTHER PUBLICATIONS

Null, Linda. "The Essentials of Computer Organization and Architecture." (c) 2003. Jones and Bartlett Publishers. pp. 234-235.*

* cited by examiner

*Primary Examiner*—Scott Baderman
*Assistant Examiner*—Phillip Guyton
(74) *Attorney, Agent, or Firm*—Gunnison, McKay & Hodgson, L.L.P.; Forrest Gunnison

(57) ABSTRACT

A programmer to set his own input error handler after examining the context where the error occurs by utilizing a set error handler subroutine. The context may be provided by the system library to the user's handler routine so it can make a better judgment on how to proceed next. The customizable nature of the invention allows programmers to suit the error handling to individual application needs.

22 Claims, 3 Drawing Sheets

USER-CUSTOMIZABLE INPUT ERROR HANDLING

FIELD OF THE INVENTION

The present invention relates to the field of computer software libraries. More particularly, the present invention relates to a user-customizable solution for handling input errors reported by software libraries.

BACKGROUND OF THE INVENTION

Computer applications which run for a long time (e.g., several days) often need to process a steady stream of input data. Often this input data will be read by libraries. For example, in the Fortran computer language, it is common to have Fortran Input/Output (I/O) libraries which may be accessed when reading or writing data. Since the applications need to be able to run continuously for a long time, non-recoverable input errors can be especially disruptive.

If, for example, the input stream contains typographical errors or transmission errors, the application will typically halt execution and signal an error since there is no way to tell the I/O library what to do with the input and continue from that point. This can cause a loss of valuable time as these applications are often left unattended. Additionally, even if the application is not left unattended, the error typically forces the user to restart the execution.

What is needed is a solution to allow an application to deal with erroneous input data from a library without having to restart.

BRIEF DESCRIPTION

A programmer to set his own input error handler after examining the context where the error occurs by utilizing a set error handler subroutine. The context may be provided by the system library to the user's handler routine so it can make a better judgment on how to proceed next. The customizable nature of the invention allows programmers to suit the error handling to individual application needs.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
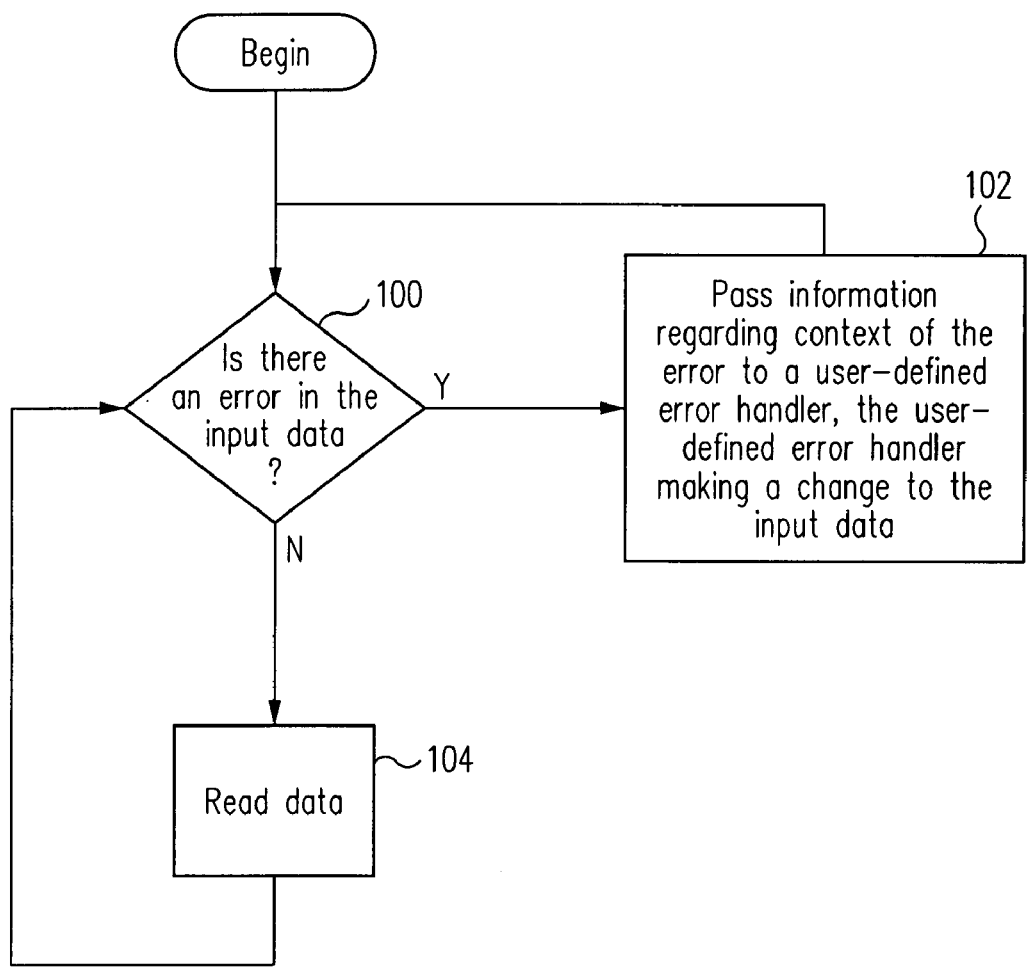
FIG. 1 is a flow diagram illustrating a method handling an input error in a computer system using an input/output (I/O) library in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention allows a programmer to set his own input error handler after examining the context where the error occurs. The context may be provided by the system library to the user's handler routine so it can make a better judgment on how to proceed next. The customizable nature of the invention allows programmers to suit the error handling to individual application needs. For example, some applications may require user intervention before the error can be handled, but other applications could do the handling automatically.

In a specific embodiment of the present invention, the error handler is specifically written to handle typical Fortran input errors. As such, the handler routine is given several choices. The first is to fix a single character. Here, a character which causes the error may be replaced with a character provided by the user's handler. This helps with common typographical errors. The second choice is to reread the current input field. Here, all characters that have been read so far for the current input field may be ignored and the handler may start again at the beginning of the field, assuming that the input file has been corrected. This is helpful in cases where an error occurred that caused two input fields to be read as one, such as the fields "12345.67" and "999.98" being read as "12345.670999.98". The third choice is to assign a value to the input field. Here, the current input field is assigned a value given by the handler, for example "0", or "Nan", and the current input data is skipped. Since the error handler can also keep track of the input elements being skipped in this manner, it can later re-process those elements and give them a reasonable value. For many applications, the reasonable value can be the average of the surrounding "cells" after all input data has been read in.

In a specific embodiment of the present invention, two new functions may be introduced. For purposes of this document, these will be known as SET_IO_ERR_HANDLER and GET_IO_ERR_HANDLER, but one of ordinary skill in the art will recognize that the name or format of these functions should not be limiting to the scope of the claims. SET_IO_ERR_HANDLER may set up a subroutine named SUB_NAME to be used as the I/O error handler for a logical unit when an input error occurs. The logical unit, SUB_NAME, and an error indicator may be indicated by parameters fed to SET_IO_ERR_HANDLER. The error indicator may be set to a non-zero value if there is an error in setting up the error handler, otherwise set to zero. The non-zero value may indicate the type of error (e.g., "Illegal Unit").

GET_IO_ERR_HANDLER may be used to get the address of the function currently being used as the error handler for this logical unit. It may take as parameters the name of the logical unit, and address of the function, and the error indicator. This function may be mainly used to save the current I/O handler, switch the error handler to another one (or turn it off), and then reset the error handler back to the saved value later.

The I/O library may pass all relevant information to a user subroutine that handles the I/O error. It may then call the error handler as appropriate. The handler then makes a change to the input data. The I/O library may then continue at the point where the error occurred using the corrected data. If there is still an error, then the user I/O error handler may be called again.

FIG. 1 is a flow diagram illustrating a method handling an input error in a computer system using an input/output (I/O) library in accordance with an embodiment of the present invention. At 100, it is determined if there is an error in the input data. If so, then at 102, information regarding the context of the error may be passed to a user-defined error-handler, the user-defined error handler making a change to the input data. The process may then return to 100, where it is again determined if there is an error. If no error occurs, the system may continue reading from the input file at 104 and checking for errors at 100.

The information regarding the context may include an identification of a logical unit of input data, an identification of the user-defined error handler, and an error indicator. The identification of a logical unit may associate an error handler to a logical unit in the same application. The error indicator may be non-zero if an error exists, the non-zero value identifying the type of the error. In one embodiment of the present invention, the change to the input data may be a replacement of a character in the input data which causes the error with a character provided by the user-defined error-handler. In another embodiment of the present invention, the change may be the erasing of a buffer holding an input field in which the error occurred. In this embodiment, when the process returns to the determining, it returns at the beginning of the input field. In another embodiment of the present invention, the change may be the assignment of a value to an input field in which the error occurred, the value indicated by the user-defined error-handler. In another embodiment of the present invention, the change to the input data may be specified by the user at run-time after the user is provided with information regarding the context of the error.

Figure 2:
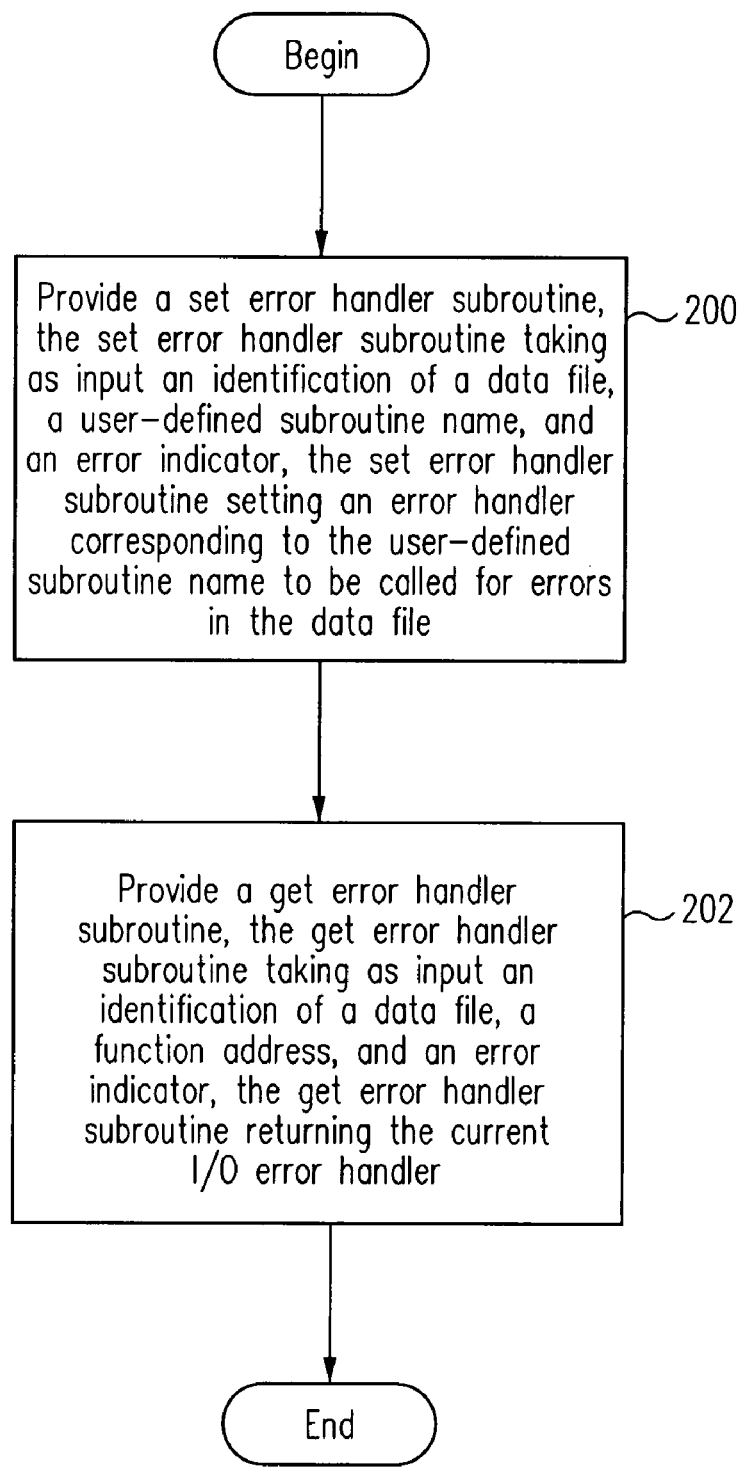
FIG. 2 is a flow diagram illustrating a method for creating a user-customizable error handler in a computer system using an I/O library in accordance with an embodiment of the present invention.

FIG. 2 is a flow diagram illustrating a method for creating a user-customizable error handler in a computer system using an I/O library in accordance with an embodiment of the present invention. At 200, a set error handler subroutine may be provided, the set error handler subroutine taking as input an identification of a data file, a user-defined subroutine name, and an error indicator, the error handler subroutine setting an error handler corresponding to the user-defined subroutine name to be called for errors in the data file. At 202, a get error handler subroutine may be provided, the get error handler subroutine taking as input an identification of a data file, a function address, and an error indicator, the get error handler subroutine returning the current I/O error handler.

Figure 3:
FIG. 3 is a block diagram illustrating an apparatus for handling an input error in a computer system using an input/output (I/O) library in accordance with an embodiment of the present invention.

FIG. 3 is a block diagram illustrating an apparatus for handling an input error in a computer system using an input/output (I/O) library in accordance with an embodiment of the present invention. An input data error determiner 300 may determine if there is an error in the input data. If so, then an error context information to user-defined error handler passer 302 coupled to the input data error determiner 300 may pass information regarding the context of the error to a user-defined error-handler, the user-defined error handler making a change to the input data. The system may then again determine if there is an error. If no error occurs, the system may continue reading from the input file and checking for errors using the input data error determiner 300 and the error context information to user-defined error handler passer 302.

The information regarding the context may include an identification of a logical unit of input data, an identification of the user-defined error handler, and an error indicator. The error indicator may be non-zero if an error exists, the non-zero value identifying the type of the error. In one embodiment of the present invention, the change to the input data may be a replacement of a character in the input data which causes the error with a character provided by the user-defined error-handler. In another embodiment of the present invention, the change may be the erasing of a buffer holding an input field in which the error occurred. In this embodiment, when the process returns to the determining, it returns at the beginning of the input field. In another embodiment of the present invention, the change may be the assignment of a value to an input field in which the error occurred, the value indicated by the user-defined error-handler. In another embodiment of the present invention, the change to the input data may be specified by the user at run-time after the user is provided with information regarding the context of the error.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for handling an input error in a computer system using an input/output (I/O) library, the method comprising:

determining, at run time by said input/output library, if there is an error in input data of a data file for a user computer program, wherein said data file is on a logical unit of said computer system; and said input data of said data file is processed by said user computer program during execution of said user computer program;

passing, by said input/output library, information regarding context of said error to a user subroutine designated by said user, wherein said user subroutine handles said error upon said determining finding said error in said input data;

calling, by said user subroutine, an error-handler for said error in said input data, said error handler making a change to said error in said input data in said data file wherein said data file includes changed input data in place of said error in said input data; and repeating said determining and passing for said changed input data in said data file by said input/output library.

2. The method of claim 1, wherein said information regarding context includes an identification of a logical unit of said input data.

3. The method of claim 1, wherein said information regarding context includes an identification of said user-subroutine.

4. The method of claim 1, wherein said information regarding context includes an error indicator.

5. The method of claim 4, wherein said error indicator is a non-zero value if said error exists, said non-zero value identifying a type of error.

6. The method of claim 1, wherein said change to said input data is replacement of a character in said input data which causes said error with a character provided by said error-handler.

7. The method of claim 1, wherein said change to said input data is erasing of a buffer holding an input field in which said error occurred.

8. The method of claim 7, wherein said repeating includes repeating beginning with a beginning of said input field.

9. The method of claim 1, wherein said change to said input data is assignment of a value to an input field in which said error occurred, said value indicated by said error-handler.

10. A method for creating a user-customizable error handler in a computer system using an I/O library, the method comprising:
    providing a set error handler subroutine, said set error handler subroutine taking as input an identification of an input data file, a user-defined subroutine name, and an error indicator, said set error handler subroutine setting an error handler corresponding to said user-defined subroutine name to be called for errors in said input data file wherein said error indicator identifies an error setting up said user-customizable error handler; and
    providing a get error handler subroutine, said get error handler subroutine taking as input said identification of an input data file, a function address, and an error indicator for an error in said input data file, said get error handler subroutine returning the current I/O error handler.

11. An apparatus for handling an input error in a computer system using an input/output (I/O) library, the apparatus comprising:
    means for determining, at run time by said input/output library, if there is an error in input data of a data file for a user computer program, wherein said data file is on a logical unit of said computer system; and said input data of said data file is processed by said user computer program during execution of said user computer program;
    means for passing, by said input/output library, information regarding context of said error to a user subroutine designated by said user, wherein said user subroutine handles said error upon said determining finding said error in said input data;
    means for calling, by said user subroutine, an error-handler for said error in said input data, said error handler making a change to said error in said input data in said data file wherein said data file includes changed input data in place of said error in said input data; and
    means for repeating said determining and passing for said changed input data in said data file by said input/output library.

12. The apparatus of claim 11, wherein said information regarding context includes an identification of a logical unit of said input data.

13. The apparatus of claim 11, wherein said information regarding context includes an identification of said user-subroutine.

14. The apparatus of claim 11, wherein said information regarding context includes an error indicator.

15. The apparatus of claim 14, wherein said error indicator is a non-zero value if said error exists, said non-zero value identifying a type of error.

16. The apparatus of claim 11, wherein said change to said input data is replacement of a character in said input data which causes said error with a character provided by said error-handler.

17. The apparatus of claim 11, wherein said change to said input data is erasing of a buffer holding an input field in which said error occurred.

18. The apparatus of claim 17, wherein said means for repeating includes means for repeating beginning with a beginning of said input field.

19. The apparatus of claim 11, wherein said change to said input data is assignment of a value to an input field in which said error occurred, said value indicated by said error-handler.

20. An apparatus for creating a user-customizable error handler in a computer system using an I/O library, the apparatus comprising:
    means for providing a set error handler subroutine, said set error handler subroutine taking as input an identification of an input data file, a user-defined subroutine name, and an error indicator, said set error handler subroutine setting an error handler corresponding to said user-defined subroutine name to be called for errors in said input data file wherein said error indicator identifies an error setting up said user-customizable error handler; and
    means for providing a get error handler subroutine, said get error handler subroutine taking as input said identification of an input data file, a function address, and an error indicator for an error in said input data file, said get error handler subroutine returning the current I/O error handler.

21. A program storage device readable by a machine, tangibly embodying a program of instructions executable by the machine to perform a method for handling an input error in a computer system using an input/output (I/O) library, the method comprising:
    determining, at run time by said input/output library, if there is an error in input data of a data file for a user computer program, wherein said data file is on a logical unit of said computer system; and said input data of said data file is processed by said user computer program during execution of said user computer program;
    passing, by said input/output library, information regarding context of said error to a user subroutine designated by said user, wherein said user subroutine handles said error upon said determining finding said error in said input data;
    calling, by said user subroutine, an error-handler for said error in said input data, said error handler making a change to said error in said input data in said data file wherein said data file includes changed input data in place of said error in said input data; and repeating said determining and passing for said changed input data in said data file by said input/output library.

22. A program storage device readable by a machine, tangibly embodying a program of instructions executable by the machine to perform a method for creating a user-customizable error handler in a computer system using an I/O library, the method comprising:

providing a set error handler subroutine, said set error handler subroutine taking as input an identification of an input data file, a user-defined subroutine name, and an error indicator, said set error handler subroutine setting an error handler corresponding to said user-defined subroutine name to be called for errors in said input data file wherein said error indicator identifies an error setting up said user-customizable error handler; and providing a get error handler subroutine, said get error handler subroutine taking as input said identification of an input data file, a function address, and an error indicator for an error in said input data file, said get error handler subroutine returning the current I/O error handler.

* * * * *